(No Model.)
E. COVERT.
SNAP HOOK.
No. 509,200. Patented Nov. 21, 1893.
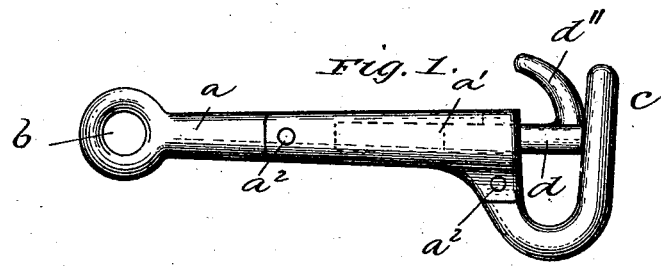
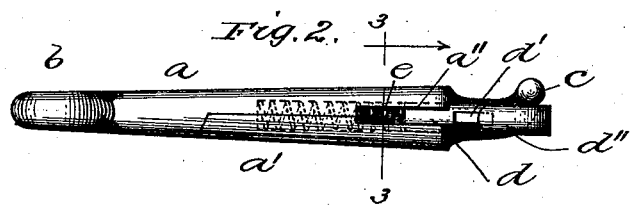
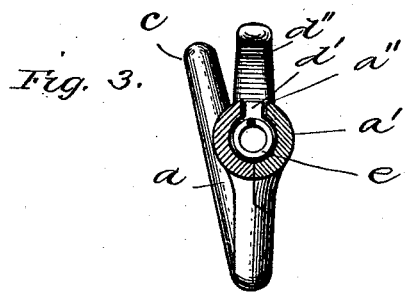
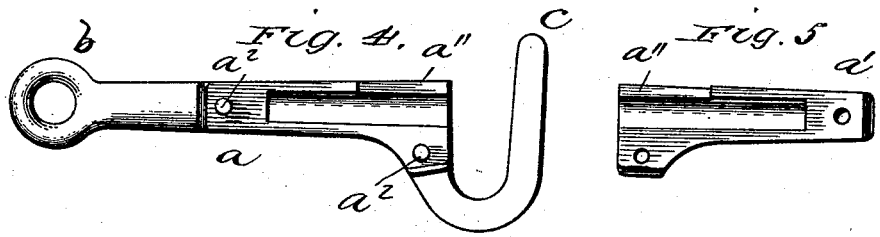
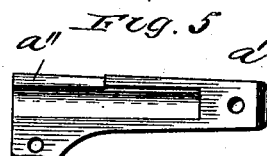
Witnesses
Chas. A. Muzzy
Parks R. McBride
Inventor
Enoch Covert
By Alexander Davis
Attorneys

UNITED STATES PATENT OFFICE.

ENOCH COVERT, OF FARMER, NEW YORK.

SNAP-HOOK.

SPECIFICATION forming part of Letters Patent No. 509,200, dated November 21, 1893.

Application filed June 2, 1893. Serial No. 476,346. (No model.)

*To all whom it may concern:*

Be it known that I, ENOCH COVERT, a citizen of the United States, residing at Farmer, in the county of Seneca and State of New York, have invented certain new and useful Improvements in Snap-Hooks, of which the following is a specification, reference being had therein to the accompanying drawings.

This invention relates particularly to that class of snap-hooks wherein a spring-controlled sliding-bolt is held in a longitudinal recess formed in the shank or body of the hook; and it has for its object to simplify the construction of the device and thereby reduce the cost thereof. To this end, it is designed to so construct the snap-hook that the cast parts thereof may be formed without cores, the two parts which form the shank or body of the hook being so formed that they may be first secured together and then the spring and bolt inserted in the longitudinal recess formed therein all of which will be fully hereinafter described and particularly pointed out in the claim appended.

In the drawings:—Figure 1 is a side elevation of my improved hook. Fig. 2 is a plan view thereof. Fig. 3 is a cross-section on line 3—3 of Fig. 2; and Figs. 4 and 5 are detail views of the parts which form the shank or body of the hook.

Referring to the various parts by letter $a$ and $a'$ designate the parts which form the shank or body of the hook; $b$ the attaching-loop formed at one end of the main part $a$ of the shank and $c$ the open hook formed at the other end thereof, the free end of said hook being cast so that it will come laterally out of line with the longitudinal bolt opening between the parts $a$ $a'$, as shown clearly in Fig. 2. The part $a$ of the shank is formed with the cut out portion which receives the side plate or part $a'$, said part $a'$ forming one half of the shank for a portion of its length and one half of the adjoining portion of the hook $c$ when the parts are assembled, as shown clearly in Fig. 1; the division between the two parts being made longitudinally of the shank and in a plane in line with the free arm of the hook when the same is bent to its proper position in line with the bolt recess, thereby enabling both parts to be cast without cores as will be readily understood. In the adjacent faces of the parts $a$ and $a'$ are formed the semi-cylindrical longitudinal grooves, which form, when the parts are assembled, the spring and bolt receptacle, said receptacle being open at its forward end; and said parts are also recessed along their adjacent outer edges to form the open slot $a''$, in which the guide lug of the sliding bolt fits and slides. The main part $a$ of the shank is formed at each end of the cutout portion with lugs or teats $a^2$, which pass through registering holes formed in the adjacent parts of the piece $a'$, and are riveted to secure the two parts rigidly together.

The sliding bolt is formed with the round shank $d$ which is provided with the radial lug $d'$, and at the forward end of this shank is formed the outwardly-curved operating lip or finger $d''$. In assembling the parts, after the parts of the shank have been riveted together as described, the bolt is inserted in the socket formed in the shank, (the coil spring $e$ having previously been inserted therein) its guide lug entering the slot $a''$, the hook $c$ coming to one side far enough to permit the ready insertion of these parts in the socket of the shank. When the parts are thus properly assembled the hook $c$ is bent back into alignment with the socket, by means of a suitable tool, and bolt $d$ will then bear resiliently against the adjacent side of the hook and will be thereby retained in position in the socket of the shank. The spring $e$ is of course compressed between the rear end of the socket and the inner end of the shank $d$ of the bolt. The hook part is cast of suitable malleable metal to permit the hook to be bent into place after the bolt and spring are riveted.

It will thus be seen that I construct my improved snap hook with the fewest possible parts, and form said parts in the simplest possible manner.

By constructing the parts which form the shank, so that they can be cast without the use of cores, is an important advantage in facilitating the work and reducing the cost. The forming of the hook $c$ so that the bolt $d$ and spring $e$ may be inserted in the socket of the shank after the parts which form the shank are secured together is an important advantage, as said parts may be more readily and quickly assembled if the operator does not have to adjust the spring and bolt in position and also hold them there while he is securing the parts together. Danger of breaking the spring and bolt is also avoided.

The parts may of course be secured together by means of independent rivets or otherwise if desired, and the operating lip or finger $d''$ of the sliding bolt may be formed as a part of the guide lug $d'$, if desired.

Having thus fully described my invention, what I claim is—

In a snap hook, the combination of a main-part $a$ cast with a hook $c$ at one end and an attaching loop at its other end and having approximately one-half its side cut away, the hook and attaching loop being approximately in the same plane, a side plate $a'$ secured over this cut-away portion, a longitudinal recess being formed between and partly in each of the two parts, the division between the parts running longitudinally through said recess and approximately in line with the free arm of the hook when the same is bent into operative position, a spring inserted in the bottom of the recess and a bolt also inserted in the recess and having its outer end bearing against the hook-arm, whereby the parts may be cast without cores and the bolt and spring inserted after the parts are secured together, substantially as described.

In testimony whereof I affix my signature in presence of two witnesses.

ENOCH COVERT.

Witnesses:
D. C. WHEELER,
J. A. SYMONDS.